United States Patent
Bauer

(10) Patent No.: US 8,794,689 B2
(45) Date of Patent: Aug. 5, 2014

(54) METHOD FOR ACTIVATING A MOTOR VEHICLE CLOSURE AND CLOSURE DEVICE FOR MOTOR VEHICLES

(75) Inventor: Angelika Barbara Maria Bauer, Raubling (DE)

(73) Assignee: Temtec Fahrzeugtechnik Entwicklungsgesellschaft mbH, Raubling (DE)

( * ) Notice: Subject to any disclaimer, the term of this patent is extended or adjusted under 35 U.S.C. 154(b) by 164 days.

(21) Appl. No.: 12/971,803

(22) Filed: Dec. 17, 2010

(65) Prior Publication Data
US 2011/0146157 A1 Jun. 23, 2011

(30) Foreign Application Priority Data
Dec. 18, 2009 (DE) .......... 10 2009 058 864

(51) Int. Cl.
*B62D 25/00* (2006.01)
(52) U.S. Cl.
USPC ..................... 296/97.22; 49/506
(58) Field of Classification Search
USPC ............ 49/25, 139, 506; 296/97.22
See application file for complete search history.

(56) References Cited

U.S. PATENT DOCUMENTS

| | | | | |
|---|---|---|---|---|
| 4,714,172 A * | 12/1987 | Morris | ............ | 220/86.2 |
| 4,795,050 A * | 1/1989 | Smith et al. | ............ | 220/746 |
| 5,027,868 A * | 7/1991 | Morris et al. | ............ | 141/59 |
| 5,234,122 A * | 8/1993 | Cherng | ............ | 220/211 |
| 6,075,460 A * | 6/2000 | Minissale et al. | ............ | 340/12.22 |
| 6,439,277 B1 * | 8/2002 | Kyburz | ............ | 141/98 |
| 7,533,919 B2 * | 5/2009 | Sauer | ............ | 296/37.12 |
| 8,091,280 B2 * | 1/2012 | Hanzel et al. | ............ | 49/25 |
| 8,122,984 B2 * | 2/2012 | Miwa et al. | ............ | 180/65.27 |
| 8,480,155 B2 * | 7/2013 | Rauscher et al. | ............ | 296/146.4 |
| 2002/0017802 A1 * | 2/2002 | Edwards | ............ | 296/136 |
| 2002/0157655 A1 * | 10/2002 | Streib | ............ | 123/520 |
| 2005/0280284 A1 * | 12/2005 | McLain et al. | ............ | 296/146.1 |
| 2006/0162702 A1 * | 7/2006 | Lahn et al. | ............ | 123/497 |
| 2006/0181108 A1 * | 8/2006 | Cleland et al. | ............ | 296/146.4 |
| 2007/0051724 A1 * | 3/2007 | DeCapua et al. | ............ | 220/203.28 |
| 2007/0262609 A1 * | 11/2007 | King et al. | ............ | 296/146.8 |
| 2008/0030045 A1 * | 2/2008 | Lai et al. | ............ | 296/146.1 |
| 2008/0100092 A1 * | 5/2008 | Gao et al. | ............ | 296/146.11 |
| 2009/0079225 A1 * | 3/2009 | Katou | ............ | 296/97.22 |
| 2011/0114637 A1 * | 5/2011 | Monig et al. | ............ | 220/212 |
| 2011/0227365 A1 * | 9/2011 | Mao et al. | ............ | 296/108 |
| 2012/0049870 A1 * | 3/2012 | Salter et al. | ............ | 324/686 |

FOREIGN PATENT DOCUMENTS

| | | | |
|---|---|---|---|
| DE | 100 20 000 A1 * | 12/2001 | |
| DE | 600 04 910 T2 | 7/2004 | |
| DE | 10 2005 030 705 | 1/2006 | |
| DE | 10 2006 036 456 | 2/2008 | |
| DE | 10 2008 047 394 | 4/2009 | |

* cited by examiner

*Primary Examiner* — Jerry Redman
(74) *Attorney, Agent, or Firm* — Nixon & Vanderhye P.C.

(57) ABSTRACT

In a method for activating a motor vehicle closure and in a closure device for motor vehicles a sensor device is activated by switching on an activation device and comprises a proximity sensor arranged in the vicinity of the closure part. The activated sensor device transmits an opening signal to the drive device to open the closure part when an approaching person and/or an approaching object comes within a predetermined distance from the proximity sensor, whereupon the drive device opens the motor vehicle closure.

8 Claims, 1 Drawing Sheet

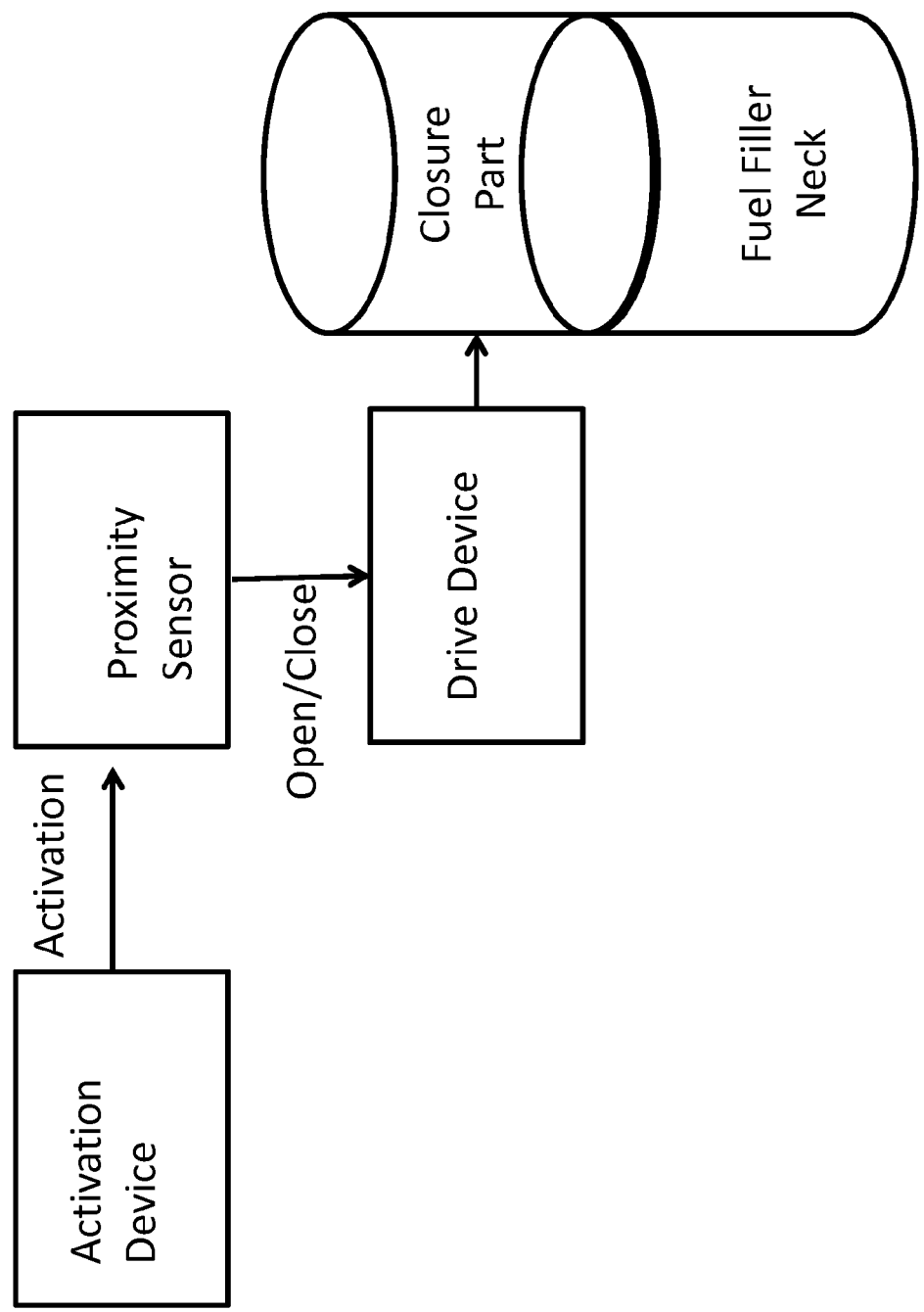

METHOD FOR ACTIVATING A MOTOR VEHICLE CLOSURE AND CLOSURE DEVICE FOR MOTOR VEHICLES

This application claims priority to DE Application No. 10 2009 058 8647 filed 18 Dec. 2009, the entire contents of each is hereby incorporated by reference.

FIELD

The invention relates to a method for activating a motor vehicle closure comprising a closure part which can be moved by a drive device and with which the orifice of a fuel filler neck can be closed, and to a closure device for motor vehicles.

BACKGROUND AND SUMMARY

Within the context of the present invention, the term "fuel" comprises all possible types of energy carrier, i.e. not only liquid fuel but also, in particular, gas and electricity. "Fuel filler necks" are therefore understood to be, in particular, as filler necks for liquid fuels as well as gas connecting nozzles and connecting nozzles for electrical energy.

In the field of motor vehicle technology, electromagnetically operative locking systems for closures, for example for vehicle body external flaps which cover fuel tank caps, are known which can be unlocked via a switch inside the vehicle or together with the central locking system. Fuel tank caps are also known which have a closure part which can be moved automatically by means of an electric motor between a closed position, in which the orifice of the fuel filler neck is closed, and an open position when the electric motor receives a corresponding opening and closing signal.

A drawback of known closure systems is that the fuel tank caps often remain open for an unnecessarily long time. As a result, gases, in particular, carbon dioxide, can escape from the tank interior into the atmosphere to an undesirably great extent. There is also the risk that a user will forget to close the fuel tank cap, as a result of which dirt, water, foreign bodies, etc. may enter the tank. In the case of electrically operated fuel tank caps, there is also often insufficient protection against trapping.

The object of the invention is to provide a method and a closure device with which it is possible to open and close a fuel filler neck in a manner which is optimised with respect to handling, the environment and security.

BRIEF DESCRIPTION OF THE DRAWING

FIG. 1 shows an example system.

DETAILED DESCRIPTION

In the method according to the invention, a sensor device which comprises a proximity sensor arranged in the vicinity of the closure part is activated by switching on an activation device. The activated sensor device transmits an opening signal to the drive device to open the closure part when an approaching person and/or an approaching object comes within a predetermined distance from the proximity sensor. The activated sensor device also transmits a closing signal to the drive device to close the closure part when the person and/or object moves away from the proximity sensor beyond the predetermined distance.

Using the method according to the invention, it is possible to open and close the motor vehicle cap in a manner which is optimised with respect to handling, the environment and security. When the activation device is switched on, preferably by manual operation of a activation member, for example a push-button, arranged in the vehicle interior, the proximity sensor checks whether a person or an object, for example a fuel filling pipe, is approaching the fuel filler neck. If this is the case, the sensor device transmits an opening signal to the drive device to open the closure part, whereupon the drive device automatically opens the closure part. If, on the other hand, the proximity sensor does not detect an approaching person or object, the closure part remains closed.

The drive device which moves the closure part is preferably an electric motor. Alternative drive devices are conceivable, for example electromagnetically, hydraulically or pneumatically operated drive devices.

Thus, a closure part can be opened in a very simple manner in that the hand, the filling pipe or a can is brought into the vicinity of the filler neck or the closure part. For example, the proximity sensor can be adjusted in such a way that the sensor device can transmit an opening signal when the person and/or the object comes within less than 30 cm of the orifice of the fuel filler neck or the closure part. A wide range of alternative response ranges of the proximity sensor are possible, for example approximately 40 cm, 20 cm, 10 cm, 5 cm or 1 cm. The proximity sensor can be formed in such a way that the sensor value of the proximity sensor increases when the fuel filler neck is approached accordingly, as a result of which a corresponding opening signal is generated for the drive device.

Once the refuelling process is complete, all that is necessary is to move the filling pipe (or the can) away from the proximity sensor beyond a predetermined distance. The sensor device reacts to this action by transmitting a closing signal to the drive device, in such a way that the closure device closes automatically. For example, the proximity sensor can be formed in such a way that, when the object moves away, the sensor value decreases and the closing signal is transmitted when the sensor value falls below a lower threshold value.

The control method according to the invention is optimal with respect to handling since the closure part is opened and closed in a fully automated manner, without any manual operation being necessary. Since the closure part is closed directly after removal of the filling pipe or can, the time during which the fuel filler neck remains open unnecessarily is minimised. This minimises the extent to which gases, in particular carbon dioxide, escape from the fuel container into the atmosphere. At the same time, effective protection against trapping is also provided, since in any case the sensor device leaves the closure part open for as long as the filling pipe, the can filling opening or the hand of the user are located in the immediate vicinity of the closure part.

Expediently, the activation device is switched on by manual operation of an activation member, for example a push-button, arranged in the vehicle interior. However, alternative activation devices are conceivable, for example via a remote control which comprises a transmitter arranged in the key of the motor vehicle.

According to a particularly advantageous embodiment, the activated sensor device is deactivated automatically once a predetermined activation period has elapsed if the proximity sensor does not detect an approaching person and/or object, i.e. if an opening signal to open the closure part is not transmitted. A deactivation of this type preferably takes place at the latest after 15 seconds to 40 seconds, in particular at the latest after 15 seconds to 30 seconds. This prevents the sensor device from remaining activated when no refuelling process takes place and the closure part from opening when a person or object comes within the detection region of the proximity sensor with no intention of opening said closure part, as well as providing effective protection against theft.

In the closure device for motor vehicles according to the invention according to claim 5, a closure part, with which the orifice of a fuel filler neck can be closed, and a drive device for moving the closure part between a closed and an open position are provided. The closure device further comprises a sensor device, which comprises a proximity sensor arranged in the vicinity of the closure part or fuel filler neck, and an activation device for activating the sensor device. The sensor device is formed in such a way that in the activated state it transmits an opening signal to the drive device to open the closure part when an approaching person and/or an approaching object comes within a predetermined distance from the proximity sensor. The sensor device is further formed in such a way that in the activated state it transmits a closing signal to the drive device to close the closure part when the person and/or the object moves away from the proximity sensor beyond the predetermined distance.

This closure device has the same advantages as have been described above in connection with the method, and reference is therefore made thereto.

The proximity sensor is advantageously arranged in the region of the fuel filler neck near the orifice or of parts located in the vicinity of the fuel filler neck. It is entirely possible for the proximity sensor to be located on the closure part itself.

All types of proximity sensors are suitable for use as a proximity sensor (proximity switch), for example inductive, capacitive, magnetic, optical, ultrasound, light barrier, or electromagnetic proximity sensors.

The advantages of the method according to the invention and the closure device according to the invention can be summarised as follows:

proper opening and closing of the closure device is ensured in all conceivable conditions;

unintentional opening is impossible;

the risk of faulty operation is minimised;

the extent to which gases, in particular carbon dioxide, escape into the atmosphere is minimised, since the closure device is open only for as long as is absolutely necessary;

ease of use is increased in relation to conventional fuel tank caps. One-handed operation is possible when refuelling. The logic of the automatic opening and closing of the closure device is comprehensible to customers.

The invention claimed is:

1. Method for activating a motor vehicle closure comprising a closure part which can be moved by a drive device and with which an orifice of a fuel filler neck can be closed, and a sensor device which is activated by switching on an activation device and comprises a proximity sensor arranged in a vicinity of the closure part, the method comprising:

transmitting an opening signal from the activated sensor device to the drive device to open the closure part when an approaching person or any approaching object comes within a predetermined distance from the proximity sensor, and transmitting a closing signal from the activated sensor device to the drive device to close the closure part when the person and any object after approaching within the predetermined distance then move away from the proximity sensor beyond the predetermined distance.

2. Method according to claim 1, wherein the vehicle includes an interior, and the method further includes switching on the activation device by manual operation of an activation member arranged in a vehicle interior.

3. Method according to claim 1, further including automatically deactivating the activated sensor device once a predetermined activation period has elapsed if the proximity sensor does not detect the approaching person or object.

4. Method according to claim 3, further including deactivating the activated sensor device after 15 seconds to 40 seconds if the proximity sensor does not detect the approaching person or object.

5. Method for operating a motor vehicle closure part structured to be moved by an automatic drive device to automatically open and close an orifice of a fuel filler neck, the method comprising:

activating a proximity sensor in a vicinity of the closure part by switching on an activation device, transmitting an opening signal from the activated sensor device to the automatic drive device to automatically open the closure part when the proximity sensor detects a passive object closer than a predetermined distance in proximity to the proximity sensor, and transmitting a closing signal from the activated sensor device to the drive device to automatically close the closure part when the proximity sensor detects that the previously detected passive object moves beyond a predetermined distance out of proximity to the proximity sensor.

6. Method according to claim 5, wherein activating comprises switching on the activation device by manual operation of an activation member.

7. Method of claim 5 further including transmitting the closing signal from the activated sensor device to the drive device to automatically close the closure part when the proximity sensor fails to detect a passive object closer than a predetermined distance in proximity to the proximity sensor for a predetermined time period after activating the proximity sensor.

8. Method of claim 5 wherein transmitting of the opening signal comprises transmitting the opening signal when the proximity sensor detects that a passive object has moved closer than a predetermined distance in proximity to the proximity sensor.

* * * * *